Sept. 29, 1953　　　　　N. A. SIEGAL　　　　　2,653,713
APPARATUS FOR RAPIDLY MOVING BOTTLES AND
SIMILAR ARTICLES AROUND SHARP BENDS
Filed July 28, 1950　　　　　　　　　　　　　　2 Sheets-Sheet 1
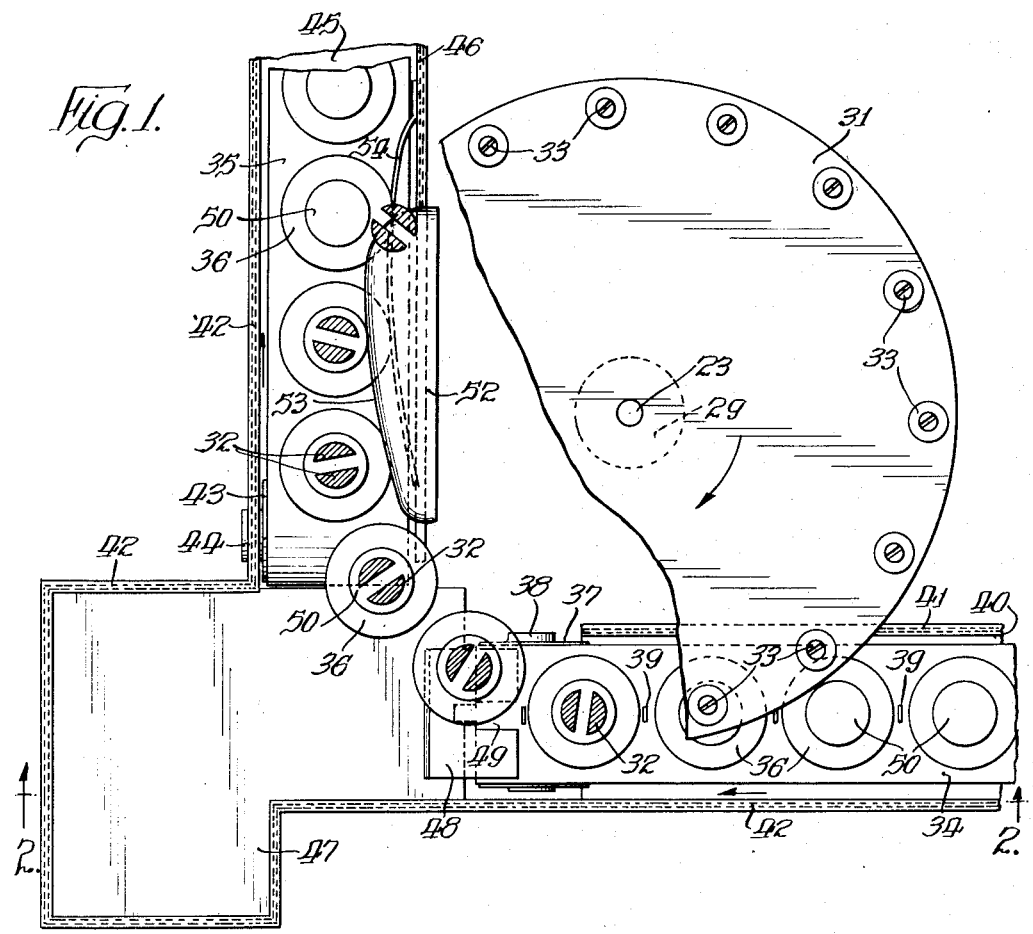
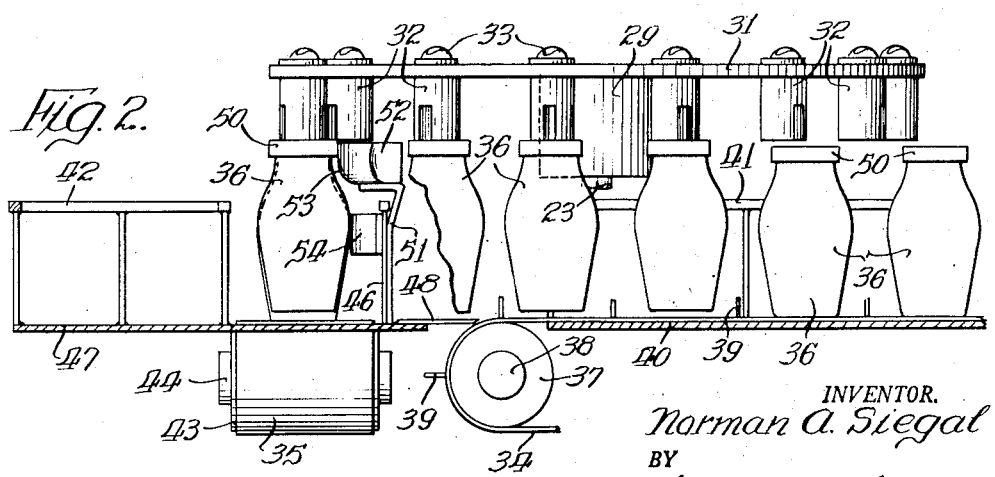
INVENTOR.
Norman A. Siegal
BY
Kegan and Kegan
Attys.

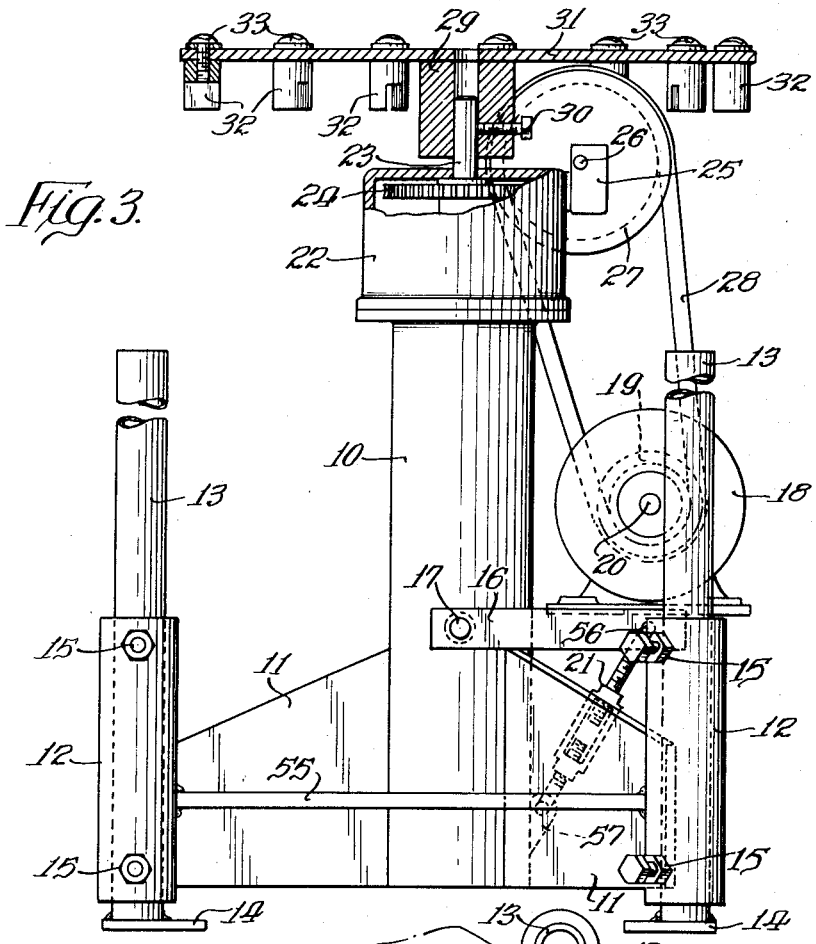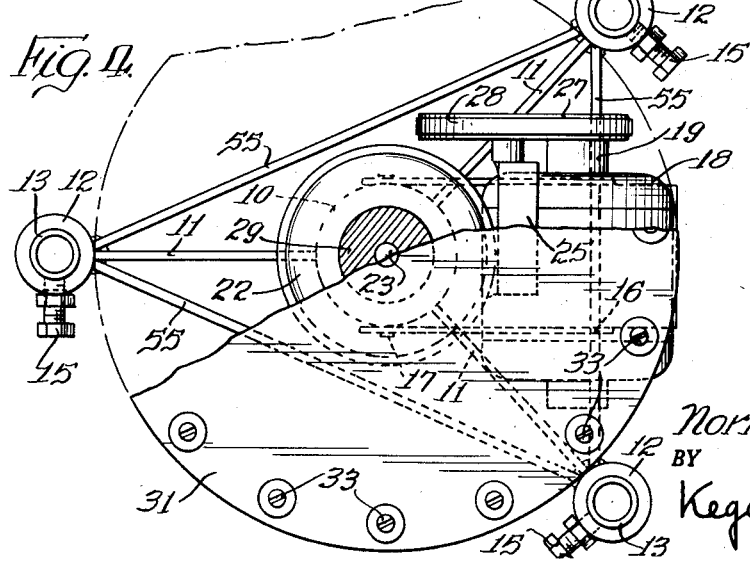

Patented Sept. 29, 1953

2,653,713

UNITED STATES PATENT OFFICE 2,653,713

APPARATUS FOR RAPIDLY MOVING BOTTLES AND SIMILAR ARTICLES AROUND SHARP BENDS

Norman A. Siegal, Chicago, Ill., assignor to Irvin Swartzberg, Chicago, Ill.

Application July 28, 1950, Serial No. 176,467

4 Claims. (Cl. 209—215)

My invention relates generally to improvements in apparatus for handling and conveying bottles and similar articles.

A principal object of my invention is to provide apparatus capable of transferring capped bottles, cans and articles composed at least in part of a magnetic substance, from one conveyor system to another.

Another important object of my invention is to provide article handling apparatus which transfers capped bottles from a first conveyor line to a second conveyor line and simultaneously rejects and segregates uncapped or improperly capped bottles.

Yet another important object of my invention is to provide apparatus which automatically picks up bottles from one conveyor line and deposits them on to another conveyor line without subjecting the bottles to reversals in direction which would tend to tip them over as they are deposited upon said second conveyor line.

Another object of my invention is to provide apparatus which is capable of transferring bottles from one line to another line at a high rate of speed, without damaging or breaking the same.

Yet another object of my invention is to provide apparatus of the type specified above which is relatively inexpensive to manufacture, yet is efficient and durable in use.

In practice, the first conveyor line is typically disposed at right angles to the second conveyor line, and the apparatus is positioned at their intersection. In one commercial embodiment of my invention the article carrying element is in the form of a turntable which is provided with a plurality of horseshoe magnets at the peripheral edge thereof to overlie the end of the first line and the beginning of the second line.

In order that my invention may be more fully disclosed, reference is had to the accompanying drawings which illustrate one form of article handling apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a fragmentary plan view of article handling apparatus according to my invention, with some parts thereof broken away and in section to show details of the design;

Figure 2 is a fragmentary front view taken in section on the line 2—2 of Figure 1, with some parts thereof broken away;

Figure 3 is a front view, taken partly in central section, showing the drive mechanism and the frame of my new apparatus; and Figure 4 is a fragmentary plan view of the apparatus of Figure 3, with some parts thereof broken away to disclose details of underlying parts.

Like reference characters designate like parts in the drawings and in the description of the apparatus of the drawings which follows hereafter.

Turning now to the drawings, and more particularly to Figures 3 and 4 thereof, the framework of my apparatus is shown as including a central support member 10 which is connected by the spanners 11 to the three upright sleeves 12. Struts 55 interconnect the sleeves 12 to provide a rigid assembly. Three legs 13 each having a foot 14 thereon, are slidable in the sleeves 12, and are adjustable relative to the sleeves 12 by means of the set screws 15. A platform 16 is hingedly supported on the central support member 10 by the shaft 17, and supports a motor 18 which includes a pulley 19 on the drive shaft 20 thereof. The angular position of the platform 16 may be adjusted by means of the turnbuckle 21, which interconnects the rod 56 on the platform 16 and the bracket 57 on the member 10.

As best shown in Figure 3, a casing 22 surmounts the central support member 10 and houses the main drive shaft 23. A worm wheel 24 drives the shaft 23, and in turn is driven through the gear reduction unit 25. The input shaft 26 of the gear reduction unit 25 is coupled to the pulley 19 of the motor 18 through the pulley 27 and the interconnecting drive belt 28.

Again referring to Figure 3, the hub 29 of the turntable 31 is secured to the main drive shaft 23 by the set screw 30. A plurality of horseshoe permanent magnets 32 are secured to the turntable 31 by the fasteners 33, said magnets 32 being distributed in a circle near the peripheral edge of the turntable 31 and spaced uniformly.

A typical installation of my apparatus is shown in Figures 1 and 2, the details of the frame and drive mechanism for the turntable 31 being deleted in these two figures for purposes of simplification. As shown in Figure 1, a first conveyor belt 34 is disposed at right angles to a second conveyor belt 35. In the embodiment of the drawings, bottles 36 are transferred from the conveyor belt 34 to the conveyor belt 35. In practice the belt 34 may be leading from a bottle capping station, while the belt 35 may feed bottles to a pasteurizer, packing machinery, or other bottle handling equipment.

The belt 34 is supported at one end by the pulley 37 on the shaft 38. It includes merely a plurality of spaced fingers 39 to insure positive movement of the bottles 36 placed thereon. A plate 40 is positioned beneath the belt 34, and serves both to support the upper span of the belt 34 and to provide a base for the railings 41 and 42. The second conveyor belt 35, substantially forming an angle of 90 degrees with the first conveyor belt 34, is supported at one end by the pulley 43 on the shaft 44. It is shown as having no holders or spacing devices for the bottles at all. A plate 45 is positioned beneath the belt 35 to support the uppermost belt flight 35 and to act as a base for the railings 42 and 46.

Positioned at the intersection of the belts 34 and 35 is a platform 47, which serves as a collecting platform for those bottles 36 which are uncapped or on which the caps 50 fit loosely, as will become more apparent. A guide plate 48 extends from the platform 47 toward the pulley 37, to support the uncapped bottles as they are moved on to the platform 47. Said plate 48 includes a notch 49 providing clearance for the fingers 39 of the conveyor belt 34, as they revolve about the pulley 37.

Referring now to Figure 2, as the bottles 36 having caps 50 thereon of enameled iron or other magnetically attracting material, move along the conveyor belt 34 toward the pulley 37, the turntable 31 rotates in timed relation, presenting a magnet 32 directly above each of the bottles 36. When the magnet 32 is substantially centered over the cap 50, the magnetic attraction is great enough to lift a bottle 36 off the conveyor belt 34 and to be thereafter held by the magnet 32. As the turntable 31 rotates, the bottles 36 are carried about the 90° curve onto the second conveyor belt 35.

Manifestly, so long as a bottle stands upon and moves along with the conveyor belt 34, substantially unsupported against lateral forces due to centrifugal action or vibration or the like, the equilibrium of the bottle is less perfect than pursuant to the picking up of the bottle by the turntable 31 as described. While the belt 34 is used as a propelling device the center of gravity is above the supporting surface; while the turntable 31 is used as a propelling device the center of gravity is below the support. As noted above the apparatus is designed for applications where bottles are to be transferred from one line to another at a high rate of speed. This object is achieved by the momentary substitution of a suspended arrangement, instead of the normal conveyor support. Both conveyor belts 34 and 35 can easily be made satisfactory for rapid, linear transfer of the bottles, with or without some vibration. However curvatures of considerable radius would be required if the same bottle were to be moved from one conveyor 34 to another 35 at right angles thereto, at the same rate of speed and subject to such normal vibration as must be expected. This radius of curvature can be reduced to a practically insignificant magnitude by the use of the top suspension turntable, at the intersection of the two belt conveyors with bottles freely standing thereon. In the event that a bottle 36 is without a cap, there is no attraction between it and the magnet 32 which is positioned thereover; hence the uncapped bottle 36 continues to move along the belt 34, across the guide plate 48 and on to the platform 47. In similar fashion, where the cap 50 fits loosely, the magnet 32 merely pulls the loose cap 50 off of the bottle 36, the bottle continuing along the conveyor belt 34 until it is carried on to the collector platform 47.

Extending upwardly from the support plate 45, and supported by a strap 51, is a bar 52 of material which is magnetically permeable, such as for example low carbon steel. The bar 52 is positioned so that its edge portion 53 extends progressively across the path described by the cap 50 of the bottle 36. Since the bar 52 is positioned just below the magnets 32, as best shown in Figure 2, there is no interference between the fixed bar 52 and the rotary moving magnets 32. As the capped bottles 36 approach the bar 52, the metal caps touch said bar 52 diminishing to a substantial degree the magnetic attraction between the horse shoe magnets 32 and the attached caps 50 of the bottles 36. Because the mass of the bar 52 is many times greater than that of the caps 50, which typically are made of thin gauge enameled iron, the magnetic attraction between the caps 50 and the magnets 32 is quickly diminished to the point where the capped bottles 36 drop off the magnets on to the conveyor belt 35. As the bottles 36 continue to move along the belt 35, the magnets 32 which carried them on to the belt 35 move away from the caps 50, as they move by the bar 52, out of magnetic range. To insure proper alignment of the capped bottles 36, as they are released from the magnet 32, I provide a guide strap 54 which contacts the central portions of the bottles 36, and guides said bottles along the belt 35. The strap 54, which is fastened to the railing 46, also cooperates with the bar 52 to prevent the bottles 36 from tipping over as they drop onto the belt 35.

In the event that a magnet 32 carries only a detached cap 50, as when the cap 50 was not tightly clamped on its bottle 36 and was pulled therefrom by the magnet, the bar 52 wipes off the cap 50 in a camming action as the latter begins to move away from the belt 35.

To adjust the apparatus to handle bottles 36 of different heights, the height of the turntable 31 above the floor may be changed by sliding the sleeves 12 relative to the legs 13, and clamping them in place by means of the set screws 15 when the proper height is reached.

Having thus fully disclosed my novel article handling apparatus and demonstrated its utility by reference to a specific embodiment for handling bottles having a metallic cap thereon, I claim as my invention:

1. In a conveying system for steel-capped glass bottles and the like, a first belt conveyor, a second belt conveyor extending at an angle with the first, each conveyor providing a flat support for bottles freely standing thereon; a turntable positioned above the intersection of the two conveyors, peripheral parts of the turntable being arranged substantially tangentially to the conveyors, magnet means movable with the turntable and extending to a lowermost position slightly above the steel-capped bottles on the first conveyor to lift such steel-capped bottles magnetically from the first conveyor, means to rotate the turntable at a peripheral speed similar to the speed of the first conveyor; wall means of readily magnetizable material, positioned beneath and adjacent the magnet means and extending along the second conveyor adjacent the turntable to deflect magnetic flux from between the magnet means and the steel-capped bottles and simultaneously to provide lateral support for the bottles which are consequently dropped onto the second conveyor.

2. A system as described in claim 1 wherein the turntable is vertically adjustable to suit glass bottles of different height.

3. A system as described in claim 1 wherein the second conveyor extends at an angle of 90 degrees with the first.

4. A system as described in claim 3 additionally comprising a platform at the end of the first belt conveyor, the first conveyor being adapted to move bottles onto said platform when such bottles are not steel capped and therefore not lifted magnetically by the turntable.

NORMAN A. SIEGAL.

References Cited in the file of this patent

UNITED STATES PATENTS

| Number | Name | Date |
| --- | --- | --- |
| 315,028 | Hilder | Apr. 7, 1885 |
| 460,962 | Gouyard | Oct. 13, 1891 |
| 960,668 | Moore | June 7, 1910 |
| 1,139,070 | Phelps | May 11, 1915 |
| 2,503,467 | Blind | Apr. 11, 1950 |